United States Patent
He

(10) Patent No.: US 8,601,249 B2
(45) Date of Patent: Dec. 3, 2013

(54) METHOD AND DEVICE FOR QUICK START UP BY SELECTIVELY STARTING UP DATA IN A NAND MEMORY IDENTIFIED AS START UP DATA

(75) Inventor: Bing-Bing He, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 606 days.

(21) Appl. No.: 12/630,954

(22) Filed: Dec. 4, 2009

(65) Prior Publication Data

US 2010/0228959 A1    Sep. 9, 2010

(30) Foreign Application Priority Data

Mar. 4, 2009 (CN) .......................... 2009 1 0300672

(51) Int. Cl.
*G06F 9/00* (2006.01)
(52) U.S. Cl.
USPC ............................................................ 713/2
(58) Field of Classification Search
USPC ............................................................ 713/2
See application file for complete search history.

(56) References Cited

U.S. PATENT DOCUMENTS

| | | | |
|---|---|---|---|
| 6,535,974 B1* | 3/2003 | Chang et al. ..................... 713/1 |
| 6,560,702 B1* | 5/2003 | Gharda et al. .................... 713/2 |
| 6,791,572 B1* | 9/2004 | Cloney et al. ................. 345/619 |
| 2004/0024562 A1* | 2/2004 | Barron et al. ................. 702/142 |
| 2004/0158701 A1* | 8/2004 | Merkin ............................. 713/2 |
| 2007/0067616 A1* | 3/2007 | Chen ................................ 713/2 |
| 2007/0260868 A1* | 11/2007 | Azzarello et al. ................ 713/2 |
| 2009/0024562 A1* | 1/2009 | Lee et al. ......................... 707/1 |
| 2009/0170473 A1* | 7/2009 | Bauernfeind et al. ......... 455/411 |
| 2010/0058045 A1* | 3/2010 | Borras et al. ..................... 713/2 |

FOREIGN PATENT DOCUMENTS

CN    1801831 A    7/2006

* cited by examiner

*Primary Examiner* — Thomas Lee
*Assistant Examiner* — Terrell Johnson
(74) *Attorney, Agent, or Firm* — Altis Law Group, Inc.

(57) ABSTRACT

A method for starting up the communication device includes searching a non-volatile storage unit of the communication device for start up data of the communication device according to a predetermined identifier of the start up data, loading the start up data into a volatile storage unit of the communication device, starting the communication device according to the start up data in the volatile storage unit. The method also includes searching the non-volatile storage unit for data except for the start up data, load the data except for the start up data into the volatile storage unit.

9 Claims, 3 Drawing Sheets

METHOD AND DEVICE FOR QUICK START UP BY SELECTIVELY STARTING UP DATA IN A NAND MEMORY IDENTIFIED AS START UP DATA

BACKGROUND

1. Technical Field

Embodiments of the present disclosure relate to loading data, and more particularly to a communication device and a method for starting up the communication device.

2. Description of Related Art

Generally, when a communication device is powered on, all data in a non-volatile storage unit of the communication device will be load into a random access memory (RAM) of the communication device. However, if a lot of data needs to be loaded into the RAM, then start up time of the communication device will be increased.

What is needed, therefore, is a communication device and a method for overcoming the aforementioned problems.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
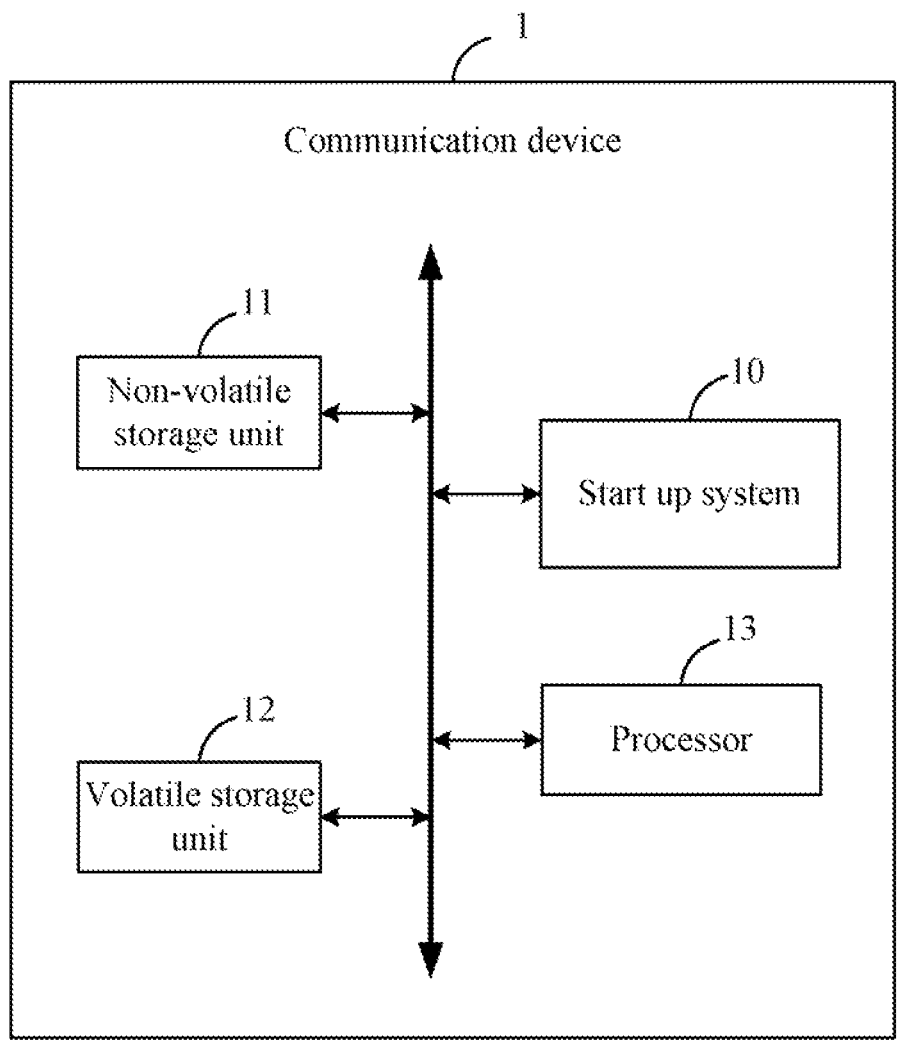
FIG. 1 is a block diagram of one embodiment of a communication device including a start up system.

FIG. 1 is a block diagram of one embodiment of a communication device 1 including a start up system 10. The start up system 10 may be used to search start up data of the communication device 1, and start the communication device 1 according to the start up data. By utilizing the start up system 10, a start up time of the communication device 1 may be efficiently improved.

The communication device 1 may be a mobile phone, a personal digital assistant (PDA), a handheld computer, or any other kind of computing device. In the embodiment as shown in FIG. 1, the communication device 1 may further include a non-volatile storage unit 11, a volatile storage unit 12, and a processor 13.

The non-volatile storage unit 11 stores start up data of the communication device 1. In one embodiment, the start up data may include an operating system of the communication device 1. The start up data may include a start up tone, images, animated cartoons, and characters, for example. The non-volatile storage unit 11 retains its data when the communication device 1 is powered off. Depending on the embodiment, the non-volatile storage unit 11 may be a read-only memory (ROM) or a flash memory, for example. The ROM may include programmable read-only memory (PROM), electrically alterable read only memory (EAROM), erasable programmable read only memory (EPROM), electrically erasable programmable read only memory (EEPROM), the flash memory includes NAND flash memory. In the present embodiment, the non-volatile storage unit 11 may be a NAND flash memory.

The volatile storage unit 12 erases its data when communication device 1 is powered off. Depending on the embodiment, the volatile storage unit 12 may be a random access memory (RAM), a dynamic random access memory (DRAM), and a static random access memory (SRAM). In the present embodiment, the volatile storage unit 12 may be RAM.

The processor 13 executes one or more computerized operations of the communication device 1 and other applications, to provide functions of the communication device 1.

Figure 2:
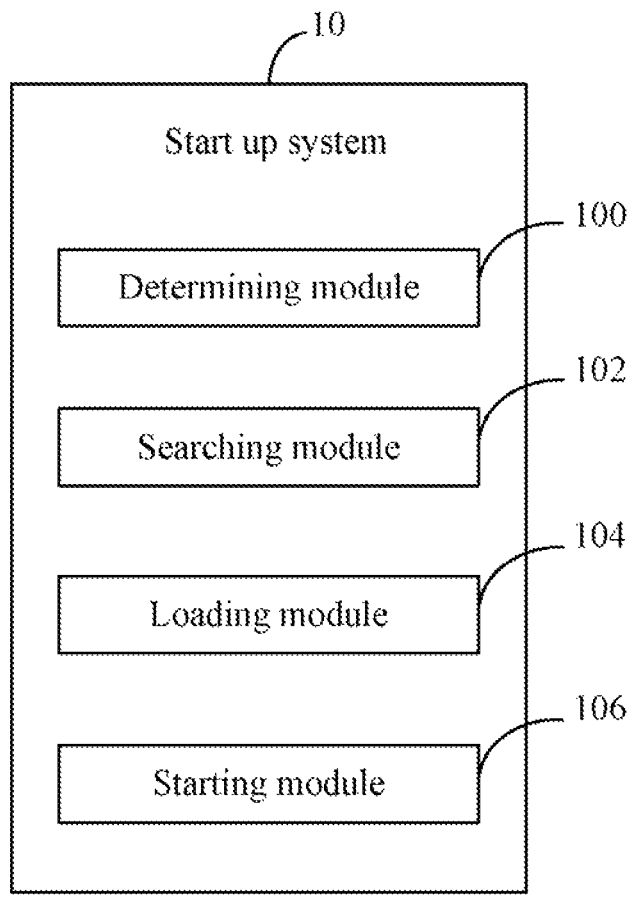
FIG. 2 is a block diagram of one embodiment of the start up system in FIG. 1.

FIG. 2 is a block diagram of one embodiment of the communication device 1 including the start up system 10. In one embodiment, the start up system 10 includes a determining module 100, a searching module 102, a loading module 104, and a starting module 106. The modules 100, 102, 104, and 106 may comprise one or more computerized operations to be executed by the processor 13 to perform one or more operations of the communication device 1. The modules 100, 102, 104, and 106 may be loaded into the volatile storage unit 12 or the non- volatile storage unit 11.

The determining module 100 determines whether the communication device 1 is powered on.

The searching module 102 searches the non-volatile storage unit 11 of the communication device 1 for start up data according to a predetermined identifier of the start up data if the communication device is powered on. As mentioned above, the start up data may include the operating system of the communication device 1. In one embodiment, the predetermined identifier of the start up data may be "start up."

The loading module 104 loads the start up data into the volatile storage unit 11 of the communication device 1. As mentioned above, the start up data may include a start up tone, images, animated cartoons, and characters, for example.

The starting module 106 starts up the communication device 1 according to the start up data in the volatile storage unit 12. The start up time of the communication device 1 will be speeded up by merely executing the start up data in the volatile storage unit 12.

The searching module 102 further searches the non-volatile storage unit 11 of the communication device 1 for the data except for the start up data. The data excepting the start up data may include application systems frequently invoked by the processor 12.

The loading module 104 loads the data except for the start up data into the volatile storage unit 12 of the communication device 1.

Figure 3:
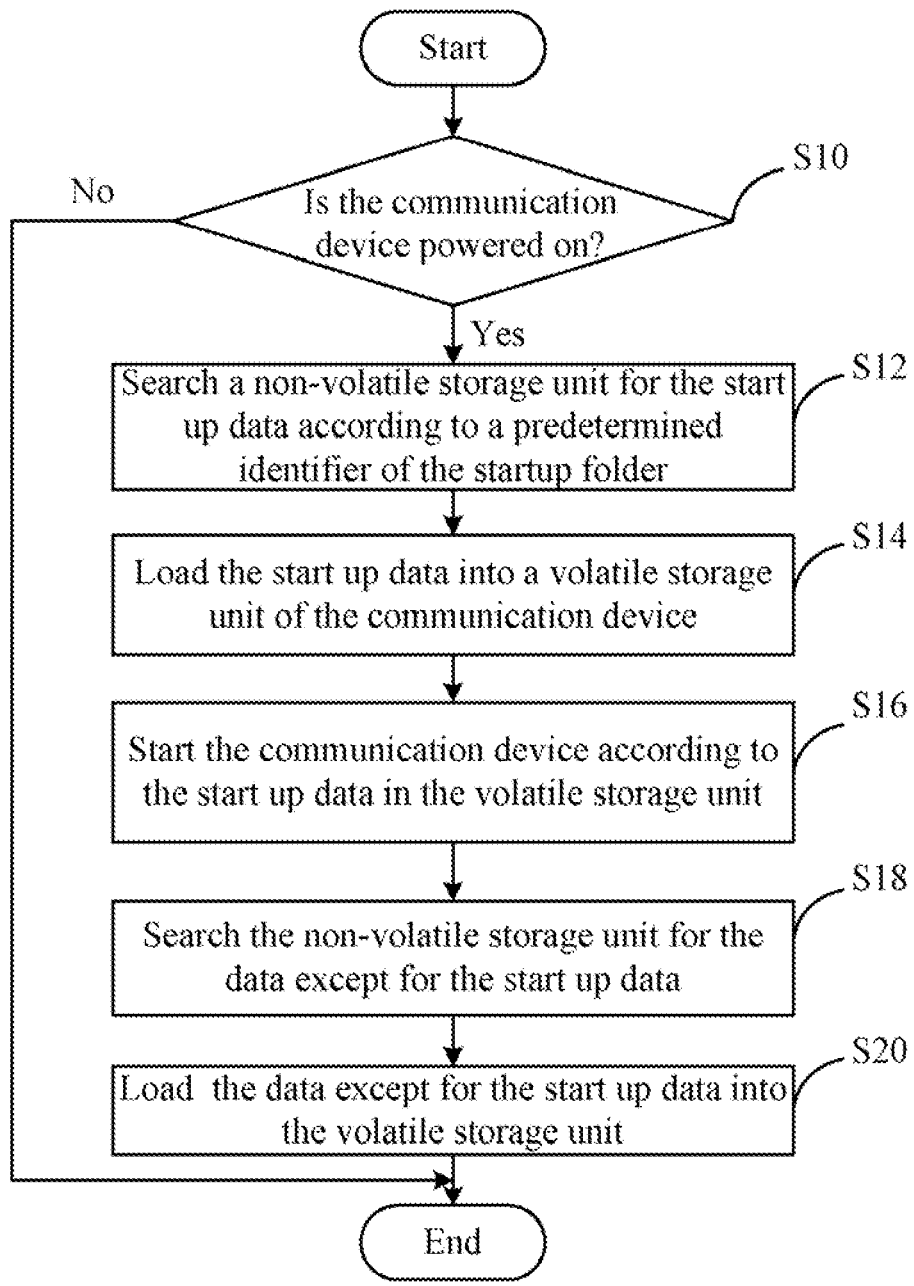
FIG. 3 is a flowchart of one embodiment of a method for starting up the communication device of FIG. 1.

FIG. 3 is a flowchart of one embodiment of a method for starting up a communication device 1. Depending on the embodiment, additional blocks may be added, others removed, and the ordering of the blocks may be replaced.

In block S10, the determining module 100 determines whether the communication device 1 is powered on.

In block S12, the searching module 102 searches the non-volatile storage unit 11 of the communication device 1 for start up data according to a predetermined identifier of the start up data if the communication device is powered on. The start up data may be the operating system of the communication device 1.

In block S14, the loading module 104 loads the start up data into the volatile storage unit 11 of the communication device 1. The start up data may include a start up tone, images, animated cartoons, and characters, for example.

In block S16, the starting module 106 starts up the communication device 1 according to the start up data in the volatile storage unit 12. The start up time of the communication device 1 will be speeded up by merely executing the start up data in the volatile storage unit 12.

In block S18, the searching module 102 further searches the non-volatile storage unit 11 of the communication device 1 for the data except for the start up data. The data excepting the start up data may include application systems frequently invoked by the processor 12.

In block S20, the loading module 104 loads the data except for the start up data into the volatile storage unit 12 of the communication device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, comprising:
   a non-volatile storage unit storing start up data of the communication device and data except for the start up data, wherein the start up data comprises an operating system of the communication device, wherein the non-volatile storage unit includes a NAND flash memory ;
   a volatile storage unit; and
   one or more programs stored in the non-volatile storage unit and being executable by the at least one processor, the one or more programs comprising:
   a searching module operable to search the non-volatile storage unit for start up data of the communication device according to a predetermined identifier of the start up data if the communication device is powered on, wherein the predetermined identifier is start up;
   a loading module operable to load the start up data into the volatile storage unit; and
   a starting module operable to start the communication device by executing the start up data in the volatile storage unit;
   the searching module further operable to search the non-volatile storage unit for the data except for the start up data, wherein the data includes frequently invoked application systems;
   the loading module further operable to load the data except for the start up data into the volatile storage unit.

2. The communication device according to claim 1, wherein the one or more programs further comprise:
   a determining module operable to determine whether the communication device is powered on.

3. The communication device according to claim 1, wherein the volatile storage unit is a random access memory.

4. A method for starting up a communication device, the method comprising:
   searching a non-volatile storage unit of the communication device for start up data of the communication device according to a predetermined identifier of the start up data if the communication device is powered on and the predetermined identifier is start up, wherein the start up data comprises an operating system of the communication device and the non-volatile storage unit includes a NAND flash memory;
   loading the start up data into a volatile storage unit of the communication device; starting the communication device by executing the start up data in the volatile storage unit;
   searching the non-volatile storage unit for data except for the start up data, wherein the data includes frequently invoked application systems;
   load the data except for the start up data into the volatile storage unit.

5. The method according to claim 4, further comprising:
   determining whether the communication device is powered on.

6. The method according to claim 4, wherein the volatile storage unit is a random access memory.

7. A non-transitory computer readable medium having stored thereon instructions that, when executed by a processor, causing the processor to perform a method for starting up a communication device, the method comprising:
   searching a non-volatile storage unit of the communication device for start up data of the communication device according to a predetermined identifier of the start up data if the communication device is powered on and the predetermined identifier is start up, wherein the start up data comprises an operating system of the communication device and the non-volatile storage unit includes a NAND flash memory;
   loading the start up data into a volatile storage unit of the communication device;
   starting the communication device by executing the start up data in the volatile storage unit;
   searching the non-volatile storage unit for data except for the start up data,
wherein the data includes frequently invoked application systems;
   loading the data except for the start up data into the volatile storage unit.

8. The medium according to claim 7, wherein the method further comprises:
   determining whether the communication device is powered on.

9. The medium according to claim 7, wherein the volatile storage unit is a random access memory.

* * * * *